Oct. 4, 1960 T. M. SWEENEY ET AL 2,954,808
OFFSET ATTACHMENT FOR RECIPROCATING SAW
Filed Feb. 28, 1957
2 Sheets-Sheet 1
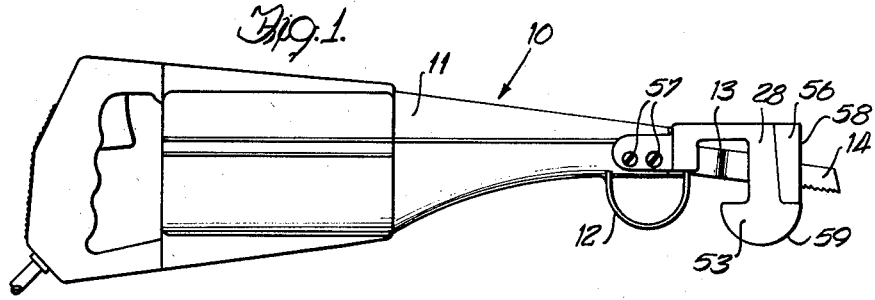
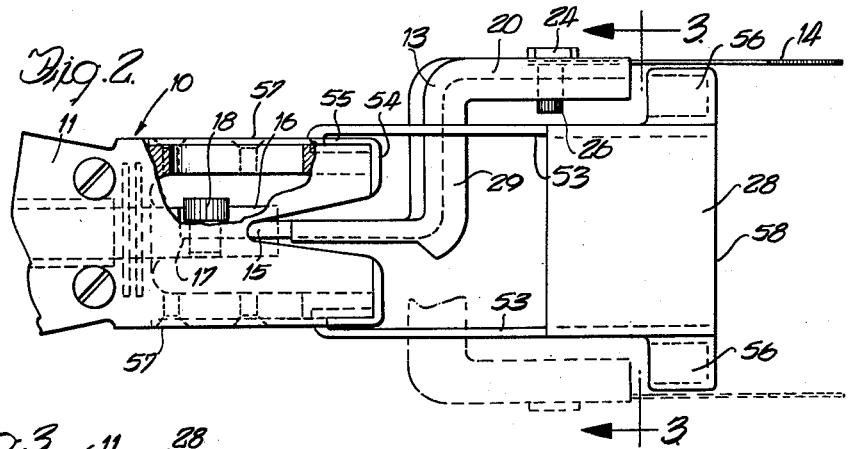
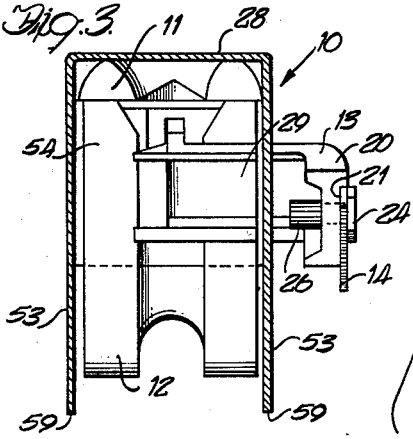
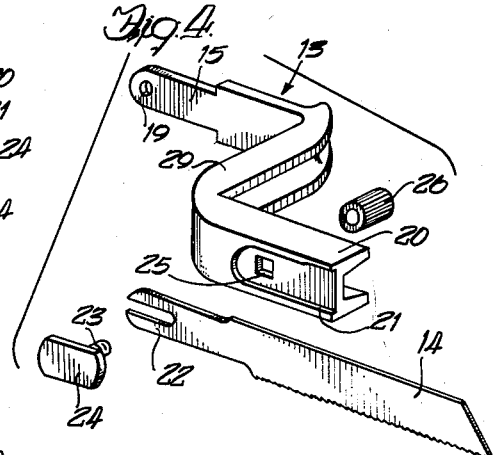
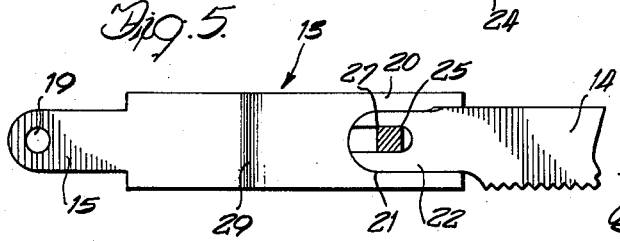
Inventors
Thomas M Sweeney
James A. Kinsella
Dalbert U. Shefte
Attorney

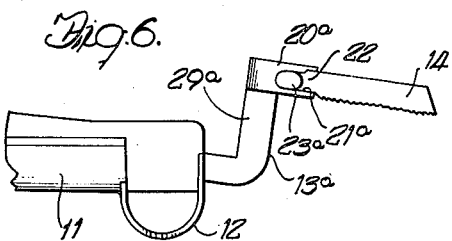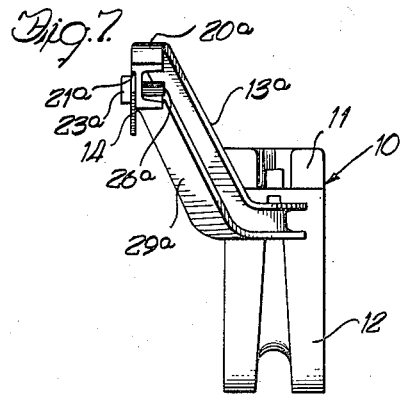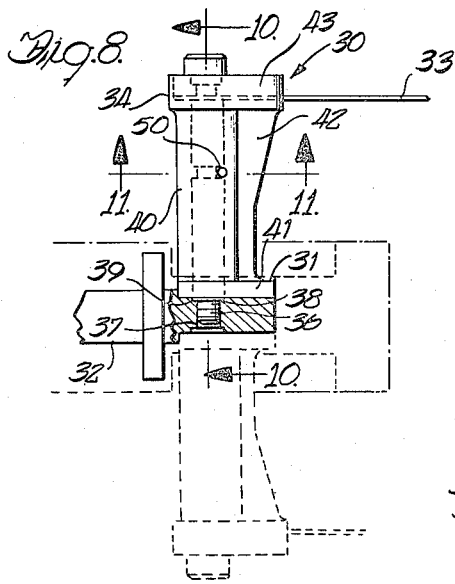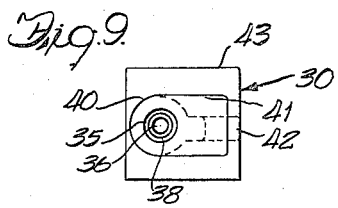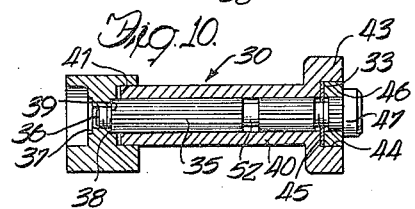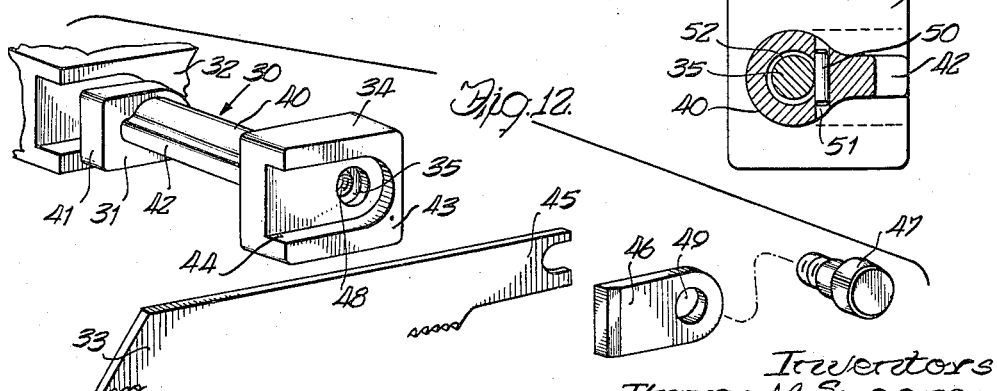

United States Patent Office 2,954,808
Patented Oct. 4, 1960

2,954,808

OFFSET ATTACHMENT FOR RECIPROCATING SAW

Thomas M. Sweeney and James A. Kinsella, Bloomington, Ill., assignors to R.C.S. Engineering Corporation, Bloomington, Ill., a corporation of Illinois Filed Feb. 28, 1957, Ser. No. 642,994

2 Claims. (Cl. 143—68)

This invention relates to an offset attachment and more particularly an offset attachment for a reciprocating power saw.

The power saw has proven to be one of the most practical and widely used power tools principally because of its improvement over the hand saw for most practical purposes. However, one of the distinct disadvantages of the standard power saw is its inability to cut flush with adjacent parallel surfaces whereas a hand saw can be manipulated substantially flush with the work. This disadvantage is caused by the size of the housing required to enclose the motor and driving linkage which operate the saw blade. Thus in the common reciprocating power saw the blade extends from the center line of the mechanism housing and is limited in approaching surfaces or objects parallel thereto by the thickness of the housing.

Many attempts have been made to obviate the above disadvantage and some power saws have been developed which can cut adjacent to parallel surfaces, but the usefulness of most of these saws are limited to a particular type of work because of a complicated supporting structure necessary to provide rigidity to overcome the effect of rapid reciprocation of the blade in the work.

What has been needed is an offset attachment for a power saw which can be universally used and is especially useful in cutting flush to adjacent surfaces. Additionally the offset attachment should be rigid in itself so as to require only a minimum supporting structure and also it is preferrable that it be removably attachable to a common power saw.

The present invention provides an offset attachment for a power saw having the above desired advantages. This is accomplished by utilizing an offset attachment which is directly mountable on the drive mechanism of a common power saw using the same attaching structure as that provided for a saw blade. The offset attachment extends laterally and has a blade attaching end for securing a blade thereon. The particular structure of the offset member provides rigid resistance during the sawing operation so as to transmit reciprocation without being bent out of alignment regardless of difficulties encountered by the blade. Further, a simple supporting structure can be secured adjacent the blade which provides the necessary support without appreciably affecting the versatility of the saw.

It is the general object of the invention to provide a new and improved offset attachment for a reciprocating saw blade.

Another object of the present invention is to provide a new and improved offset attachment having a laterally extending portion to permit operation of a saw blade substantially flush with an adjacent surface.

A further object of the present invention is to provide an offset attachment as described above which is attachable to a standard power saw.

Still another object of the present invention is to provide an offset attachment as described above which is sufficiently rigid in itself, requiring only a simple supporting structure.

A still further object of the present invention is to provide a new and improved offset attachment having a lateral portion extending diagonally upwardly.

Further objects and features of the present invention will be obvious from the following description and drawings in which:

Figure 1 is a side elevational view of a power saw utilizing an offset attachment illustrating an embodiment of the present invention.

Fig. 2 is a partial top plan view of the device of Fig. 1.

Fig. 3 is a vertical sectional view taken along line 3—3 of Fig. 2.

Fig. 4 is an exploded view of the offset attachment portion of Fig. 1.

Fig. 5 is a vertical sectional view taken along line 5—5 of Fig. 2.

Fig. 6 is a side elevation of a first alternate embodiment of the offset attachment of this invention.

Fig. 7 is a front elevational view of the device of Fig. 6.

Fig. 8 is a top plan view of an offset attachment illustrating a second alternate embodiment of the present invention.

Fig. 9 is an elevational view of one end of the offset attachment of Fig. 8.

Fig. 10 is a horizontal sectional view taken along line 10—10 of Fig. 8.

Fig. 11 is a horizontal sectional view taken along line 11—11 of Fig. 8, and

Fig. 12 is an exploded view of the offset attachment of Fig. 8.

While this invention is susceptible of embodiments in many different forms there is shown in the drawings and will herein be described in detail several embodiments with the understanding that the present disclosure is to be considered as an exemplification of the principles of the invention and is not intended to limit the invention to the embodiment illustrated. The scope of the invention will be pointed out in the appended claims.

Referring now to the drawings and in particular Figures 1 through 5, one embodiment of the offset attachment of this invention is shown in conjunction with a standard power saw indicated generally as 10. The motor and driving linkage of the power saw are not shown as it is contemplated that with slight modifications the embodiments described herein can be adapted to almost any standard power unit now on sale. Thus in Fig. 1 these parts would be included within the housing 11.

The standard unit of Fig. 1 is provided with a U-shaped support 12 for use of the unit without the offset attachment. This support is attached to the forward end of the housing and serves as a rocker for rocking the saw blade into the work. Further, the support 12 has a bifurcated front portion 54 that straddles a blade when the offset attachment is not in use, and has flanges 55 secured to the housing 11. This front portion forms a flat surface which abuts the work when sawing and when coupled with a slight blade angle that permits cutting only on the back-stroke, the unit is rigidly held against the work, thereby lessening vibratory movement of the unit.

The offset attachment 13 is shown attached to the housing with its inner end 15 shaped to fit snugly in the same slot 17 of the reciprocating member 16 previously used for mounting the blade when the offset was not being used. The offset is secured in the slot 17 by a locking screw 18 which extends through the screw hole 19 in the inner end of the offset and screws into the reciprocating member.

A blade 14 is attached to the other end 20 of the offset by being mounted in a blade receiving slot 21 shaped to accommodate the bifurcated end 22 of the blade. The blade is rigidly held in the slot by a locking bolt 23 which extends through the bifurcated end 22 of the blade and the bolt receiving hole 25 in the offset. The bolt has a flat head 24 which frictionally tightens the blade in place when a locking nut 26 is screwed on the end of the bolt. To more rigidly secure the blade in place the hole may be square as shown in Figs. 4 and 5 with sides aligned with the bifurcated portion of the blade and the bolt 23 is then provided with a square shoulder 27 that mates with the hole and bifurcated end.

The blade receiving slot 21 of the offset can be shaped as desired to accommodate any of the various commercial blade shapes and is preferably positioned at a slight downward angle so that the blade will cut only on the backstroke, the forward stroke being utilized to clean the teeth of the blade.

The offset 13 has an intermediate portion 29 extending laterally away from the reciprocating member 16 so as to space the blade 14 to the side of the unit for operation parallel to an adjacent surface, being substantially flush therewith. The only spacing required between a flat work surface and the blade is that necessary to accommodate the flat head 24 of the locking bolt 23. However, even this spacing can be eliminated by pressing the blade against the work so as to flex the blade.

As shown in the drawings the offset 13 is formed from a metal such as steel and has a channel shaped cross section for added strength and rigidity so that a complicated or cumbersome support member is unnecessary to steady the unit and insure proper alignment of the blade.

However, to provide the unit with the same rigidity available when being used without the offset, an extended support 28 is secured to the housing 11 by having a pair of parallel sides 53 removably attached to either side of the housing as by screws 57. The sides extend forwardly to a position adjacent the blade 14 and have laterally outwardly extending portions 56 which approach the blade to provide a support close to the blade. Both sides 53 are shaped as above described so that the extended support 28 can be used regardless of whether the offset extends to one side or the other.

To provide a work abutting surface, a part plate 58 is formed across the front of the sides 53 which steadies the unit 10 when the plate is pulled against the work by the backstroke cutting of the blade affected by the slight downward angle of the blade. A 7° angle has been found to provide excellent results.

The lower edge 59 of each side is angularly shaped to form rockers for rocking of the blade into the work, the action being similar to that of the U-shaped support 12 described above.

Referring now to Figs. 6 and 7 a first alternate embodiment of the present invention is shown which is similar in many respects to the embodiment shown in Figs. 1 through 5 and described above. Thus the same power saw 10, housing 11, support 12, and blade 14 are shown and a somewhat similar offset 13a having a similar end 20a, blade receiving slot 21a, locking bolt 23a and locking nut 26a, but with a slightly different intermediate portion 29a. This intermediate portion is shaped to not only extend laterally but also upwardly so that the blade is positioned substantially higher than the support member 12 to provide additional rocking movement for advancing the blade downwardly into the work and also to permit operation of the saw adjacent surfaces directly above where limited clearance between the blade and the above surface is limited. The blade is preferably positioned at a slight downward angle similarly as shown in the embodiment of Figs. 1–5 and a similar extended support could be used if desired.

Referring now to Figs. 8 through 12 a second alternate embodiment of the offset attachment of this invention is illustrated. This offset attachment 30 has one end 31 attached to the reciprocating member 32 of a standard power saw and extends laterally therefrom so that a saw blade 33 attached to the other end 34 of the offset will be positioned for operation substantially flush with an adjacent surface.

Turning more particularly to the construction of the offset 30 it is seen that it consists of a knurled rod 35 having a reduced threaded end 36 for engagement with the threaded hole 37 in the reciprocating member 32. For rigidity the shoulder 38 adjacent the end 36 of the rod seats in a recess 39 in the reciprocating member. To further strengthen the offset a supporting housing 40 is mounted over and is contiguous with the knurled rod 35 and has one end 41 shaped to fit snugly in the reciprocating member. The housing 40 is generally cylindrical but is provided with a re-enforcing longitudinal rib 42 to provide added strength and rigidity. The other end 43 of the housing is enlarged to accommodate the new blade 33 and is provided with a blade receiving slot 44 for the receipt of the bifurcated end 45 of the blade. The blade is secured in the slot 44 by means of a lock plate 46 which is mounted over the blade and within the slot. A lock screw 47 extends through the lock plate 46 of the bifurcated end of the saw blade 33 and into a threaded opening in the end of the knurled rod 35. The lock screw 47 engages the threaded opening 48 of the knurled blade and has an enlarged shoulder which seats in the lock plate opening 49 so that when the lock screw 47 is screwed tightly into the rod the lock plate 46 is forced against the saw blade 33 to frictionally secure the blade in place.

To assemble the offset attachment 30 to the reciprocating member 32 the knurled rod 35 is first secured in the hole 37. The supporting housing 40 is then slid over the rod into engagement with the reciprocating member and locked in place to prevent lateral movement of the housing by means of a pin 50 which is wedged in a pin receiving hole 51 in the housing for engagement with a reduced portion 52 of the rod. Thus lateral movement of the housing 40 is prevented by inter-engagement of the housing, pin and rod. The blade 33 is then mounted in the blade receiving slot 44 and locked in place by the lock screw 47 which forces the lock plate 46 into engagement with the blade. The blade is angled slightly downwardly similarly to the blade of the other embodiments described.

As is obvious from the above description and drawings this second alternate embodiment can be made sufficiently rigid to withstand almost any difficulty encountered in operating the saw. The housing and its associated rib can be made as strong as desired without affecting the ability of the saw blade to approach adjacent parallel surfaces. The distance the blade can be spaced from an adjacent surface being limited only by the thickness of the lock plate and the head of the lock screw.

Thus the present invention in either of the embodiments illustrated provides an offset attachment which can be detachably mounted to a standard power saw to laterally space the saw blade so as to be operable substantially flush with an adjacent parallel surface. As no complicated or bulky supporting structure is required the power saw remains operable for substantially all the practical purposes for which it was used prior to the attachment of the offset. The offset is simple and easily constructed and reasonably inexpensive so as to be a practical expedient to the problem of laterally spacing the blade of a power saw.

We claim as our invention:

1. In a power saw, the combination of a housing, a drive member mounted on said housing for reciprocation along a predetermined path, an attachment comprising end portions laterally spaced apart and secured together rigidly by a cross member, one of said end portions lying against and being secured to said reciprocating member with the other end portion disposed in either of two positions paralleling and disposed on opposite sides of said path of reciprocation, a saw blade secured to said other end portion in parallelism with said path and in one of said positions, and a housing extension secured to said housing on opposite sides of said path and having openings to receive said cross member when said other end portion is in each of said positions, said housing extension providing work engaging supports on opposite sides of said path between and closely adjacent said saw blade in both of said positions.

2. In a power saw, the combination of a housing, a drive member mounted on said housing for reciprocation along a predetermined path, an attachment comprising end portions laterally spaced apart and secured together rigidly by a cross member, one of said end portions lying against and being secured to said reciprocating member with the other end portion disposed in either of two positions paralleling and disposed on opposite sides of said path of reciprocation, and a saw blade secured to said other end portion in parallelism with said path and in one of said positions, said housing having openings on opposite sides of said path to receive said cross member when said other portion is in each of said positions, said housing also having a portion extending beyond said reciprocating member and providing work engaging supports on opposite sides of said path between and closely adjacent said saw blade in both of said positions.

References Cited in the file of this patent

UNITED STATES PATENTS

| 616,927 | Hicks | Jan. 3, 1899 |
| 1,905,482 | Magri | Apr. 25, 1933 |
| 2,722,244 | Schultz | Nov. 1, 1955 |

FOREIGN PATENTS

| 208,301 | Switzerland | Apr. 16, 1940 |